Dec. 11, 1951 A. BASHOVER 2,578,035
LOCKABLE SLIDE FASTENER
Filed March 9, 1949 3 Sheets-Sheet 1

INVENTOR.
ALBERT BASHOVER
BY James and Franklin
ATTORNEYS

Dec. 11, 1951　　　A. BASHOVER　　　2,578,035
LOCKABLE SLIDE FASTENER
Filed March 9, 1949　　　　　3 Sheets-Sheet 2
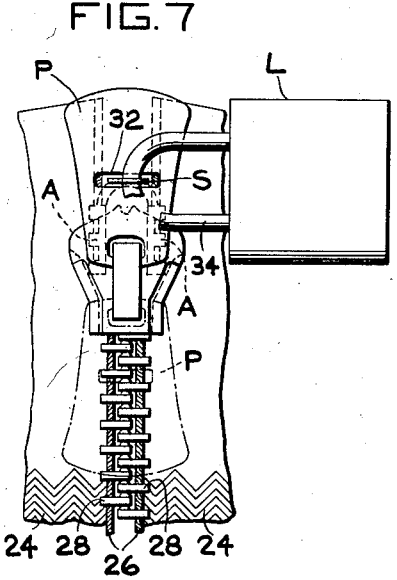
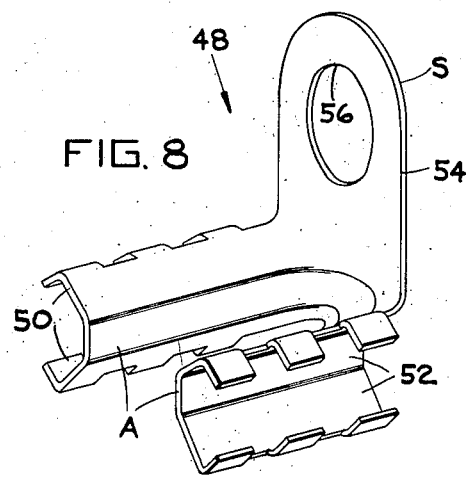
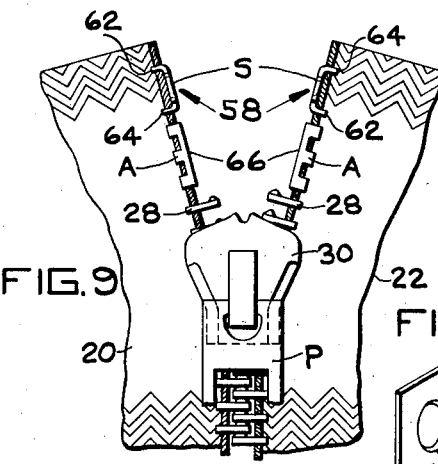
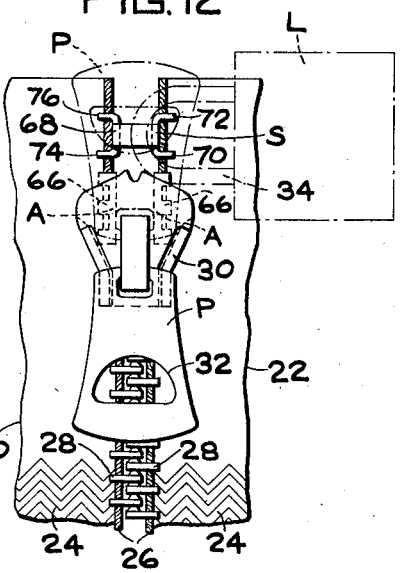
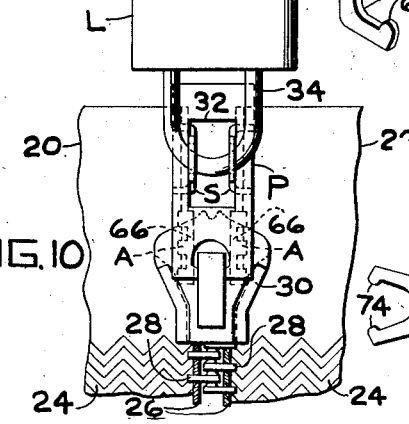
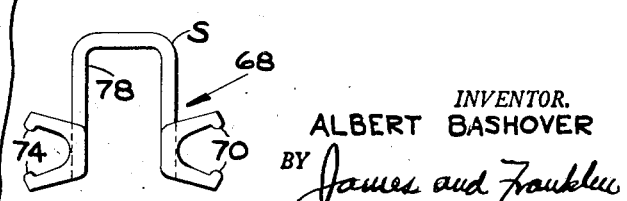
INVENTOR.
ALBERT BASHOVER
BY James and Franklin
ATTORNEYS

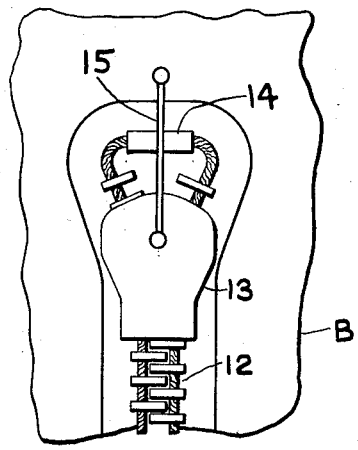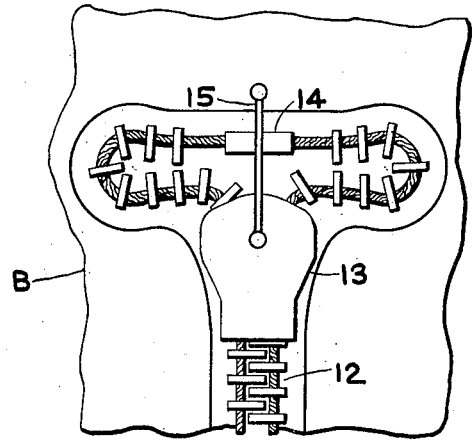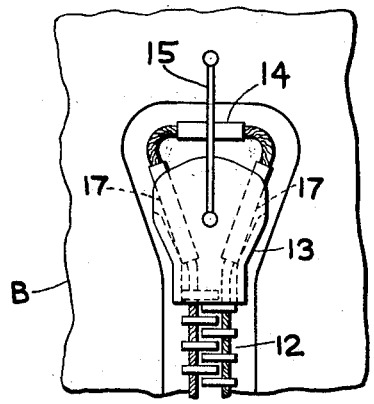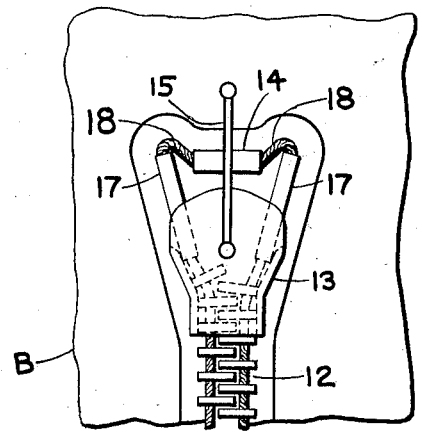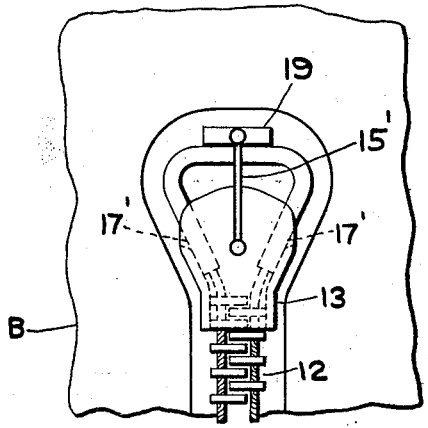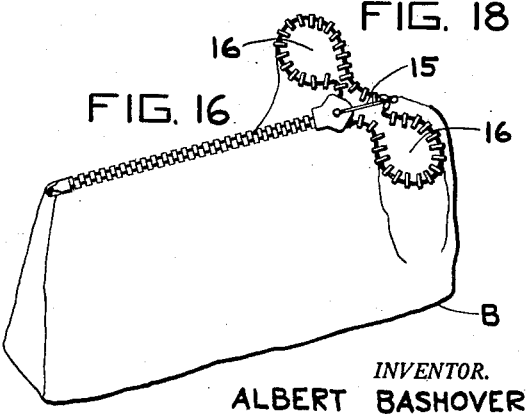

Patented Dec. 11, 1951

2,578,035

UNITED STATES PATENT OFFICE 2,578,035

LOCKABLE SLIDE FASTENER

Albert Bashover, Newark, N. J., assignor to Conmar Products Corporation, Newark, N. J., a corporation of New Jersey Application March 9, 1949, Serial No. 80,367

17 Claims. (Cl. 70—68)

The invention relates to slide fasteners, and more particularly to slide fasteners arranged to be secured by means of a padlock.

The use of a padlock to anchor the slider of a slide fastener in closed position has been known for many years and is illustrated, for example, in U. S. patent to Sundback 1,557,382 and U. S. patent to Delamater et al. 1,557,433, both issued October 13, 1925. In simplest and most usual form the pull of the slider is apertured, and the bag, or other structure fitted with the fastener, is provided with a ring or staple at the "top" end of the fastener, the arrangement being such that the padlock may be used to anchor the slider against unauthorized opening movement, that is, toward the "bottom" end of the fastener.

It has been discovered that with a soft flexible bag, such as a pouch or bag carried by a messenger in financial circles, for securities or for money, it is possible to gain access to the bag without unlocking the slider. This may be done by working or "snaking" the stringers through the slider in an upward direction, that is, toward the padlock. The slider will act as a stationary fixture through which the stringers can be moved gradually until a small opening is formed, whereupon this opening is readily enlarged at each side of the lock until ample to insert one's hand. After examining or pilfering the contents of the bag, the stringers are readily drawn in opposite direction, that is, downward, until they have been drawn all the way back through the slider, whereupon the bag has exactly the same appearance as it had before. This, of course, defeats the main purpose of locking the bag, for although it is understood that a money bag and its contents may be stolen entirely, the purpose of locking the bag is merely so that it may be despatched to its destination with the assurance that the messenger or others cannot gain access to the contents without leaving some tell-tale evidence of tampering.

The primary object of the present invention is to overcome the foregoing difficulty, and to provide relatively simple and inexpensive means which will prevent snaking of the stringers through the slider to form an unauthorized opening while the slider remains anchored in locked position.

The pending application of Jack M. Schaye, Serial No. 664,794, filed April 25, 1946, now patent No. 2,569,076, dated September 25, 1951, having the same assignee as the present application, discloses a padlock slide fastener which is complete as fabricated and sold by the slide fastener manufacturer, except that the padlock may be supplied separately. The manufacturer of the envelope bag or handbag or the like merely sews the slide fastener into the article, much as is done with ordinary slide fasteners not having a padlock.

Another object of the present invention is to provide means for positively preventing the jimmying or snaking of the padlocked slide fastener, while retaining the advantages of a complete, unitary padlock slide fastener which needs only to be sewn into the article in order to achieve a finished money bag or the like.

To accomplish the foregoing general objects, and other more specific objects which will hereinafter appear, my invention resides in the slide fastener, locking elements and positive tamperproof means, and their relation one to the other as are hereinafter more particularly described in the following specification. The specification is accompanied by drawings in which:

Fig. 7 is a view similar to Fig. 2, illustrating a third form of the invention;

Fig. 8 is a perspective view, on an enlarged scale, of a device used with the modified form of the invention shown in Fig. 7;

Fig. 9 is a view similar to Fig. 1 showing a fourth form of the invention;

Fig. 10 is a view of the slide fastener shown in Fig. 9 but with the fastener in locked condition;

Fig. 11 is a perspective view, on an enlarged scale, of a device used in the form of the invention shown in Figs. 9 and 10;

Fig. 12 is a fragmentary, plan view of a fastener showing one end of still another form of the invention, the locked condition being indicated by the dot and dash lines of the pull and padlock;

Fig. 13 is an end view of a device used in the slide fastener of Fig. 12; and

Figs. 14 through 19 are schematic views explanatory of the theory and operation of the invention.

Figure 1:
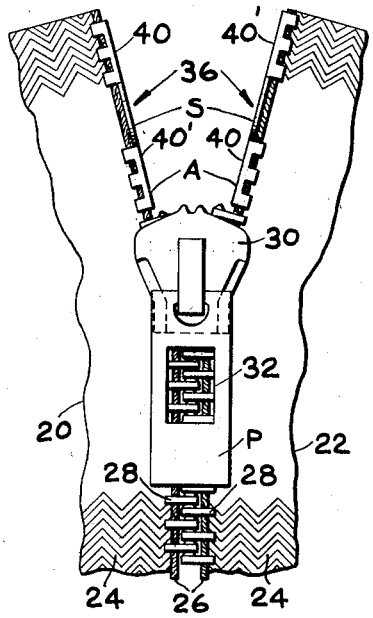
Fig. 1 is a fragmentary, plan view showing one end of a slide fastener embodying features of my invention, the fastener being in unlocked condition, though nearly closed.

Referring to the drawing, and more particularly to Fig. 14, a closed slide fastener is schematically indicated at 12, it having been closed by upward movement of a conventional slider schematically shown at 13, the slider being disposed adjacent the top end of the fastener, here symbolized by part 14, which might, for example, be a bridge stop. Suitable lock means, schematically represented by the link 15, serves to physically anchor the slider 13 against downward movement, with a view to preventing unauthorized opening of the fastener. However, it has been discovered that when the slide fastener forms a part of a flexible bag, it is possible to gradually work or snake the stringers of the fastener upward through the stationary slider, thus forming small openings at each side of the link 15, as is schematically shown in Fig. 15. After such small openings have been started it is a comparatively easy matter to enlarge the same, as is shown on pouch B in Fig. 16, in which large openings 16 have been formed on each side of the link 15 without unlocking the link.

Referring now to Fig. 17, the fastener there shown is similar to that already described, except that in the present case stiffening means 17 is secured to one or both of the stringers immediately below the top end 14. The stiffening means have a cross-section dimensioned to be received within the slider 13, and have a length adequate to prevent snaking of the stringers outwardly through the slider. This is illustrated in Fig. 18, in which it will be seen that on attempting to work the stringers upwardly through the slider, the flexible portions 18 are too short to succeed. In other words, the stiffening means 17 are so long compared to the slack at 18 that when the parts 17 are raised as far as possible their lower portions are still within the slider. They cannot be worked through or out of the slider, and consequently no opening such as that shown in Figs. 15 and 16 can be made.

Referring now to Fig. 19, the link 15' may be anchored to a staple 19 formed integrally with and supported by the stiffening means 17'. Moreover, the link 15' may itself be the pull of the slider 13. It is preferred to mount the staple directly on the stringers, and it is even better to make the same integral with the stiffening means, but neither refinement is wholly essential when the invention is viewed in its broadest aspect.

The invention is illustrated in detail in a number of specific forms, and referring to Figs. 1 through 13 of the drawings, the invention in all its forms comprises generically a slide fastener, the slider pull P of which is appropriately apertured to act as a hasp fitting over a staple or loop S, preferably secured directly to the fastener. The shackle of a suitable lock L passes through the staple S and prevents movement of the pull and slider away from the staple. In accordance with the present invention, relative movement between the slider and the stringers is prevented by means A received within the slider, said means making it impossible to open the slide fastener or the receptacle intermediate the slider and staple.

The staple S and/or the means A also serve as a "top" stop for limiting the movement of the slider along the fastener. The terms "top" and "bottom" are here used as is customary in the art, but it will be understood that the fastener may be horizontal, or oriented in any position. The fastener is fabricated as a complete unit by the slide fastener manufacturer. The manufacturer of the bag or receptacle need merely sew the fastener into the bag or the like to achieve a finished product.

In all forms of the invention, the fastener comprises stringers 20 and 22 formed of tapes 24 having beaded edges 26 to which are secured spaced, interlockable fastener elements 28. The fastener elements 28 are engaged or disengaged by a slider 30 having the usual Y-shaped channel, and movable therealong by means of a pull P. The pull P is apertured at 32, the aperture being so dimensioned as to fit over the staple S to act as a hasp. When the shackle 34 of a padlock L is passed through the staple and over the pull the slider cannot be moved away from the staple.

Figure 2:
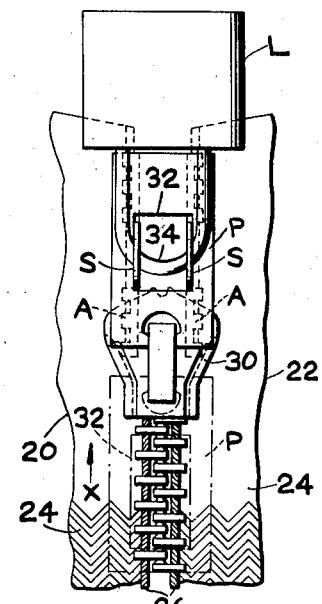
Fig. 2 is a view similar to Fig. 1 but with the fastener in locked condition.
Figure 3:
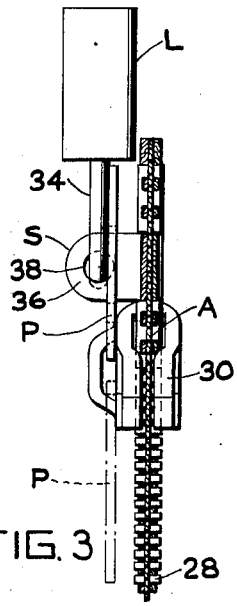
Fig. 3 is a side elevation of the locked slide fastener.
Figure 4:
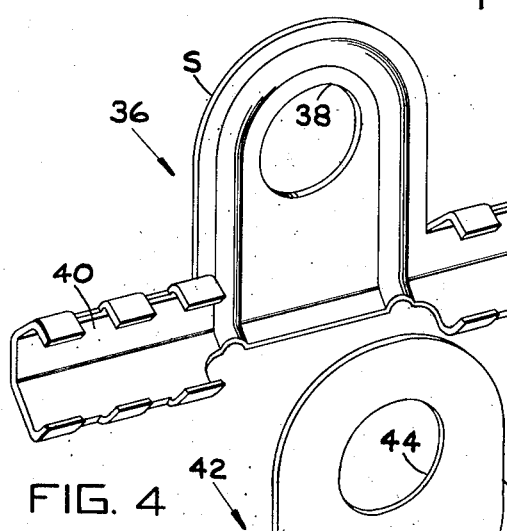
Fig. 4 is a perspective view, on an enlarged scale, of a device which serves as a slider stop and as a staple to receive the pull and the padlock, and which also provides means for preventing snaking movement through the locked slider.

In the form of the invention shown in Figs. 1 through 4, the upper ends of the stringers 20 and 22 are separable. A stiffening device or element 36, shown in detail in Fig. 4, is attached directly to the beaded edge of each stringer tape immediately adjacent each stringer's endmost fastener element 28. (If the length of the fastener is critical, it would be more accurate to say that a number of the endmost elements are omitted and replaced by the device 36.) The device 36 preferably is formed as a metal stamping and comprises a longitudinally extending, vertically projecting staple portion S formed with an aperture 38. Channel-like jaws 40 and 40' of substantially equal length and the same configuration are formed integrally with the staple portion S, one pair on each side thereof. The devices 36 are clamped directly upon the beaded edge of each stringer 20 and 22. By forming the device 36 symmetrically, as shown, identical devices can be used on both stringers, thereby eliminating the polarization problem which would otherwise exist if one pair of jaws were omitted. With the devices 36 of the construction shown, it simply is necessary to reverse the positions of the jaws 40 and 40' of a pair of devices longitudinally of the stringers 20 and 22, and special right and left-handed devices are unnecessary. The jaws 40 and 40' preferably are castellated or crenelated, that is, they are notched to afford maximum clamping strength, for the textile bead of the tape swells outwardly in the notches. The large amount of clamping area provided by the jaws 40 and 40' lengthwise of the stringer tapes also provides increased clamping strength.

To lock the fastener, or the bag in which it is incorporated, the slider 30 is moved upwardly from the bottom of the fastener past the position shown in Fig. 1 to the position shown in Figs. 2 and 3, where it is stopped by the presence of the devices 36. The aperture 32 of the pull P is swung over the pair of projecting staples S, and the shackle 34 of a lock L inserted through the staple apertures 38 and over the pull. In this position the jaws 40' on the stringer 20 and jaws 40 on the stringer 22 have entered and are disposed within the arms of the Y-shaped channel of the slider. The presence within the slider channel of the relatively stiff, rigid material makes it impossible to flex the stringers 20 and 22 through the slider by pushing upon the fastener, or the adjoining flexible portions of the bag to which the fastener stringers are sewn, in the direction designated X in Fig. 2. Thus, the jaws serve a double purpose, for they secure the staples to the fastener, and they project into the slider channel and provide means for preventing relative movement between the stringers 20, 22, and the slider 30. With this construction, the fastener will resist tampering of the kind described in connection with Figs. 15 and 16 of the drawing.

The use of a pair of devices 36, one on each stringer, is preferred because of the symmetrical appearance of the finished fastener, as well as the increased strength which the duplication of jaw clamping area affords. However, it is within the scope of the invention to omit one of the elements 36, for it has been found that the use of only one element also is satisfactory.

Figure 5:
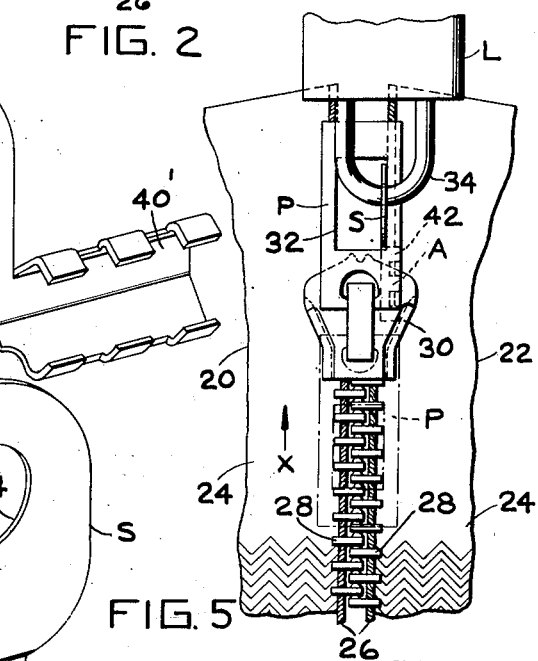
Fig. 5 is a view similar to Fig. 2, illustrating a second form of the invention.
Figure 6:
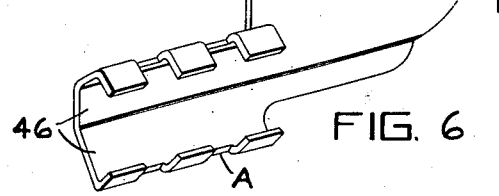
Fig. 6 is a perspective view, on an enlarged scale, of a device used with the modified form of the invention shown in Fig. 5.

In the form of the invention shown in Figs. 5 and 6, but one device, designated 42, acts as a stop to limit the movement of the slider, and provides the staple S and stiffening means A for preventing relative movement between the stringers and the staple when the slider is locked to the staple. The element 42 preferably comprises a metal stamping formed with a staple S extending longitudinally thereof, and having an aperture 44. A pair of jaws 46 are formed integrally with the projecting staple portion S. The jaws 46 form a channel which is clamped onto the beaded edge of one of the stringers, in this case the stringer 22, immediately adjacent the uppermost element 28 thereof. When in the position shown in Fig. 5, the pull P is moved from the position indicated in dot-dash lines to the position indicated by the solid lines, permitting the shackle 34 of the padlock L to be passed over the pull and through the staple aperture 44, thereby preventing relative movement between the slider and staple. Jaws 46 which clamp the staple S upon the stringer 22 are disposed within the right-hand branch of the slider channel, thereby providing relatively rigid means A which will prevent flexing the stringers 20 and 22 through the slider if the stringers are pushed in the direction X. If desired, a second element similar to device 42 may be attached to the stringer 20. The second device, however, while having a similar construction to the device 42, will not be identical therewith, for they will be right and left-handed pieces.

Figs. 7 and 8 illustrate still another form of the invention wherein the ends of the stringers, instead of being separable, are connected by a bridge type of element designated 48. The device 48 comprises two pairs of spaced jaws 50 and 52 disposed in the same plane and approximately parallel to each other connected by means of a vertical, transverse bridging projection 54 which acts as the staple S. The staple has an aperture 56 which permits the shackle 34 (Fig. 7) of the padlock L to be inserted therethrough when the pull P is disposed over the staple S. In this instance also, the element's clamping jaws provide the stiffening means A. It will be observed that the aperture in the pull is formed to receive the transverse rather than a longitudinally extending staple projection.

It is within the scope of the invention to modify the transverse staple device 48 by forming it with but one pair of jaws, either 50 or 52, instead of both pairs of jaws. One pair of jaws will adequately secure the device to the tape and provide the stiffening means A for preventing relative movement between the slider and the stringers. In effect this would be a device as in Fig. 6, but with the staple bent to transverse instead of longitudinal position. However, such a modification would not act as a so-called "bridge top stop."

In the form of the invention shown in Figs. 9, 10 and 11, the means A for preventing relative movement between the stringers and the slider is formed as a separate element, instead of as an integral part of the device providing the staple S. As shown in Fig. 11, a device 58 is formed with an upstanding projection which provides the staple S. The projection is formed with a staple aperture 60. The device 58 is formed at each end with pairs of clamping jaws 62 and 64. A pair of devices 58 are fixedly attached directly to the beaded edges of the stringers 20 and 22 by clamping the jaws 62 and 64 thereon. The device 58 is symmetrical in the sense that identical elements may be used on both the stringers 20 and 22, thereby eliminating the necessity for polarizing right and left-hand elements. A separate channel or sleeve, designated 66, preferably formed with castellated or crenelated jaws, is clamped onto the beaded tape edge 24 intermediate the device 58 and the topmost fastener element 28, on each stringer 20 and 22. The sleeve 66 and device 58 are so attached to the beaded tape edge of each stringer that there are very small spaces intervening therebetween. By so attaching the components it is impossible to flex the stringers through the slider when the fastener is locked as shown in Fig. 10. When the stiffening sleeves or channels 66 are within the slider, any attempted flexure of intervening stringer tape make them abut each other, and they provide a relatively rigid mass of metal which will prevent snaking the stringers through the slider.

Figs. 12 and 13 illustrate still another form of the invention similar to Figs. 9, 10 and 11 in that the stiffening means A for preventing relative movement of the stringers with respect to the slider, is separate from the staple-providing device. This modification, however, differs from the aforementioned fastener construction in that instead of the staple or staples being disposed longitudinally of the fastener, a single bridge type of staple is used. This bridge type of device, designated 68, comprises pairs of spaced jaws 70, 72 and 74, 76 connected by the transverse, vertically projecting staple portion S. The staple portion S does not require an aperture because it affords an equivalent opening 78 due to the manner in which the device is formed. Because the bridge type of staple is used, the pull is preferably shaped somewhat as in Fig. 7. The fastener is locked as previously described, and results in the slider being locked to the staple, and the stringers being held within the slider so that they cannot be flexed or snaked upwardly through the same.

Reverting to Figs. 9 and 10, it will be apparent that a suitable fastener is obtainable by the use of one device 58 or/and one sleeve 66, instead of pairing the components on both stringers, as there shown. Also, it is within the scope of the invention to omit one sleeve 66 in the fastener illustrated in Fig. 12.

While the staple-producing elements or devices, and the means for preventing relative movement between the slider and the stringers, have been described as being secured directly to the stringer tapes by means of jaws formed thereon, it is within the scope of the invention to use any other equivalent attaching means. If desired, these devices or elements may be attached to the stringers by rivets. Moreover, in the case of the staple, it is not at all essential that it be secured directly to the stringer tapes, although I consider that to be preferable. The staple may be separately secured directly to the pouch or bag. However, it should be so located and constructed as to limit pushing movement of the stringers through the slider to an amount less than the length of insertion of the stiffening channels into the slider.

It will be apparent that while the invention has been illustrated and described in several preferred forms, changes may be made in the constructions disclosed, without departing from the spirit of the invention as sought to be defined in the following claims.

I claim:

1. In combination, flexible slide fastener stringers having a top end and a bottom end, a slider movable from the bottom to the top end of said stringers to close the stringers, an apertured pull on the slider for operating the same, a staple at the top end of the stringers over which the pull acting as a hasp is received preparatory to passing the shackle of a padlock through the staple in order to anchor the slider at the top end of the stringers to prevent unauthorized opening movement toward the bottom end of the stringers, stiffening means secured to one or both of said stringers immediately below the top end of the stringers, said stiffening means having a cross-section dimensioned to be received within the slider and having a length adequate to prevent snaking of the stringers upwardly through the slider to form an unauthorized opening while the slider remains anchored in position relative to the top end of the stringers by the aforesaid lock means.

2. In combination, flexible slide fastener stringers having a top end and a bottom end, a slider movable from the bottom to the top end of said stringers to close the stringers, an apertured pull on the slider for operating the same, a staple at the top end of the stringers over which the pull acting as a hasp is received preparatory to passing the shackle of a padlock through the staple in order to anchor the slider at the top end of the stringers to prevent unauthorized opening movement toward the bottom end of the stringers, stiffening means secured to one or both of said stringers immediately below the top end of the stringers, said stiffening means having a cross-section dimensioned to be received within the slider and having a length adequate to prevent snaking of the stringers upwardly through the slider to form an unauthorized opening while the slider remains anchored in position relative to the top end of the stringers by the aforesaid lock means, said stiffening means consisting of sheet metal channeled to form a sleeve which is clamped directly on the stringer around the edge bead thereof.

3. In combination, flexible slide fastener stringers having a top end and a bottom end, a slider movable from the bottom to the top end of said stringers to close the stringers, an apertured pull on the slider for operating the same, a staple at the top end of the stringers over which the pull acting as a hasp is received preparatory to passing the shackle of a padlock through the staple in order to anchor the slider at the top end of the stringers to prevent unauthorized opening movement toward the bottom end of the stringers, stiffening means secured to one or both of said stringers immediately below the top end of the stringers, said stiffening means having a cross-section dimensioned to be received within the slider and having a length adequate to prevent snaking of the stringers upwardly through the slider to form an unauthorized opening while the slider remains anchored in position relative to the top end of the stringers by the aforesaid lock means, said staple being formed integrally with and being supported by said stiffening means.

4. In combination, flexible slide fastener stringers having a top end and a bottom end, a slider movable from the bottom to the top end of said stringers to close the stringers, an apertured pull on the slider for operating the same, a staple at the top end of the stringers over which the pull acting as a hasp is received preparatory to passing the shackle of a padlock through the staple in order to anchor the slider at the top end of the stringers to prevent unauthoriezd opening movement toward the bottom end of the stringers, stiffening means secured to one or both of said stringers immediately below the top end of the stringers, said stiffening means having a cross-section dimensioned to be received within the slider and having a length adequate to prevent snaking of the stringers upwardly through the slider to form an unauthorized opening while the slider remains anchored in position relative to the top end of the stringers by the aforesaid lock means, said stiffening means consisting of sheet metal channeled to form a sleeve which is clamped directly on the stringer around the edge bead thereof, and said staple being formed integrally with and being supported by said stiffening means.

5. A slide fastener arranged to be locked by means of a padlock, said slide fastener comprising a pair of stringers each formed of tape having spaced interlockable fastener elements secured thereto, a slider having a Y-shaped channel for engaging and disengaging said elements, an apertured pull on the slider for operating the same, a staple over which the pull acting as a hasp is received preparatory to passing the shackle of a padlock through the staple, said staple being secured directly to at least one of the tapes, and means secured to at least one of the tapes and extending within the slider channel when the staple is received by the apertured pull to prevent relative movement between the slider and the stringers.

6. A slide fastener arranged to be locked by means of a padlock, said fastener comprising a pair of stringers each formed of tape having spaced, interlockable fastener elements secured thereto, a slider having a Y-shaped channel for engaging and disengaging said elements, an apertured pull on the slider for operating the same, a device providing a staple over which the pull acting as a hasp is received preparatory to passing the shackle of a padlock through the staple, said device being secured directly to at least one of the tapes, and means integral with said device extending within the slider channel when the staple is received by the apertured pull to prevent relative movement between the slider and the stringers.

7. A slide fastener as defined in claim 6, wherein the device is of the bridge type and is secured directly to both tapes.

8. A slide fastener as defined in claim 6, wherein another device is secured directly to the other tape, said devices being symmetrical lengthwise of the tapes whereby the devices are identical in construction.

9. A slide fastener arranged to be locked by means of a padlock comprising a pair of stringers each formed of tape having spaced, interlockable fastener elements secured thereto, a slider having a Y-shaped channel for engaging and disengaging said elements, an apertured pull on the slider for operating the same, a device providing a staple over which the pull acting as a hasp is received preparatory to passing the shackle of a padlock through the staple, said device being secured directly to at least one of the tapes, and additional means secured directly to at least one of said tapes adjacent said staple extending within the slider channel when the staple is received by the apertured pull to prevent relative movement between the slider and the stringers.

10. A slide fastener as defined in claim 9, wherein the device is of the bridge type and is secured directly to both tapes.

11. A slide fastener as defined in claim 9, wherein another device is secured directly to the other tape, said devices being symmetrical lengthwise of the tapes whereby the devices are identical in construction.

12. A slide fastener arranged to be locked by means of a padlock, said slide fastener comprising a pair of stringers each formed of tape having spaced, interlockable fastener elements secured thereto, a slider having a Y-shaped channel for engaging and disengaging said elements, an apertured pull on the slider for operating the same and a device providing a staple over which the pull acting as a hasp is received preparatory to passing the shackle of a padlock through the staple, said device being formed with jaws clamped directly upon at least one of the tapes, said jaws being formed to extend within the slider channel when the staple is received by the apertured pull to prevent relative movement between the slider and the stringers.

13. A slide fastener as defined in claim 12, wherein the device is of the bridge type and is clamped directly upon both tapes.

14. A slide fastener as defined in claim 12, wherein another device is clamped directly upon the other tape, said devices being symmetrical lengthwise of the tapes whereby the devices are identical in construction.

15. A slide fastener arranged to be locked by means of a padlock, said slide fastener comprising a pair of stringers each formed of tape having spaced, interlockable fastener elements secured thereto, a slider having a Y-shaped channel for engaging and disengaging said elements, an apertured pull on the slider for operating the same, a device providing a staple over which the pull acting as a hasp is received preparatory to passing the shackle of a padlock through the staple, said device being formed with jaws clamped directly upon at least one of the tapes, and a sleeve clamped directly upon one of said tapes adjacent said staple extending within the slider channel when the staple is received by the apertured pull to prevent relative movement between the slider and the stringers.

16. A slide fastener as defined in claim 15, wherein the device is of the bridge type and is clamped directly upon both tapes.

17. A slide fastener as defined in claim 15, wherein another device is clamped directly upon the other tape, said devices being symmetrical lengthwise of the tapes, whereby the devices are identical in construction and a second sleeve is clamped directly upon said other tape.

ALBERT BASHOVER.

REFERENCES CITED

The following references are of record in the file of this patent:

UNITED STATES PATENTS

| Number | Name | Date |
| --- | --- | --- |
| 399,451 | Tiffany | Mar. 12, 1889 |
| 1,966,963 | Jordan | July 17, 1934 |
| 2,190,609 | Farnstrom | Feb. 13, 1940 |
| 2,397,037 | Norkin | Mar. 19, 1946 |

FOREIGN PATENTS

| Number | Country | Date |
| --- | --- | --- |
| 413,825 | Great Britain | July 26, 1934 |